United States Patent [19]

Dodson et al.

[11] 3,884,870

[45] May 20, 1975

[54] POLYETHYLENE TEREPHTHALATE FILM

[75] Inventors: Keith D. Dodson, Greenville, S.C.;
Thomas G. Squires, Durango, Colo.

[73] Assignee: Celanese Corp., New York, N.Y.

[22] Filed: July 15, 1974

[21] Appl. No.: 488,593

[52] U.S. Cl..................... 260/40 R; 260/DIG. 35
[51] Int. Cl............................................ C08g 51/04
[58] Field of Search .......... 260/40 P, 40 R, DIG. 35

[56] References Cited
UNITED STATES PATENTS 3,821,156  6/1974  Farrar ............................. 260/40 R Primary Examiner—Donald E. Czaja
Assistant Examiner—S. M. Person
Attorney, Agent, or Firm—Thomas J. Morgan; Linn I. Grim

[57] ABSTRACT

A biaxially oriented polyethylene terephthalate film having excellent clarity in combination with good handleability. The film of the present invention is characterized by the inclusion of about 0.3 to about 2.5 percent by weight of a small particle size inert additive having an average particle size ranging between about 10 and 1000 millimicrons. The film furthermore includes a large particle size inert additive present in a concentration of about 0.002 percent to about 0.018 percent by weight of a large particle size inert additive having an average particle size in the range of between about 0.5 and 30 microns.

9 Claims, No Drawings

3,884,870

POLYETHYLENE TEREPHTHALATE FILM

BACKGROUND OF THE DISCLOSURE

1. Field of the Invention

This invention is directed to an improved polyethylene terephthalate film having excellent clarity in addition to good handleability. More specifically, the instant invention is directed to a polyethylene terephthalate film which includes dispersed particles of inert additives providing clarity and good handleability. Still more specifically, the instant invention is directed to a polyethylene terephthalate film having a small particle size inert additive and a large particle size inert additive dispersed therewithin to provide excellent clarity and good handleability.

2. Summary of the Prior Art

The excellent properties of polyethylene terephthalate film is evidenced by its use in ever increasing applications. One major use of polyethylene terephthalate film which has increased significantly in recent years is in the general area of clear films. Polyethylene terephthalate clear films have been recognized by those skilled in the art as combining the superior strength property of polyethylene terephthalate film in combination with excellent clarity.

The requirement for a clear polyethylene terephthalate film is well established in many applications. Among these are packaging films where the product packaged must be clearly seen. Another application for clear polyethylene terephthalate film is the so-called "metallized" film. Metallized polyethylene terephthalate films are formed by the application of a metal, usually aluminum, onto one or both sides of the film. The metallized film is used as a decorative material. Obviously, the film must have excellent clarity in order for the metallized coating to be effective.

It would seem that the production of a clear film would be simple. It is well established that thin polyethylene terephthalate film is quite clear. However, clear, unfilled polyethylene terephthalate film is very difficult to work with. Specifically, the coefficient of friction, which is a measure of the handleability of the film in processing, such as in winding and unwinding, is unacceptably high. A clear, unfilled polyethylene terephthalate film often blocks and is thus unacceptable. Many solutions to the problem of good handleability for clear polyethylene terephthalate films have been suggested. A commonly employed method suggested in the prior art is the inclusion within the film of an inert additive. The inert additive, by providing a degree of roughness, usually improves the handleability by significantly decreasing the coefficient of friction which is a direct measure of the handleability of the film. However, the inclusion of inert additives have had the detrimental effect of significantly decreasing the clarity of the film.

A recent development in abrasion resistant film technology, has offered a new direction to the solution of the problem of finding a so-called "clear-slip" film. Copending application, U.S. Ser. No. 215,141 filed on Jan. 3, 1972, and now U.S. Pat. No. 3,821,156, and assigned to the same assignee as the instant application, employs the concept of using two inert additives in different size ranges. However, when the teachings of this invention were applied to the production of a clear-slip film the results were unsuccessful.

SUMMARY OF THE INVENTION

The instant invention is directed to a biaxially oriented polyethylene terephthalate film which not only has outstanding clarity but also very good handleability. The invention employs two inert additive in concentration ranges outside the ranges contemplated for abrasion resistant films.

In accordance with the instant invention a polyethylene terephthalate film is provided. The film, which is biaxially oriented, includes substantially completely dispersed small size particles of an inert additive in a concentration in the range of between about 0.3 percent and 2.5 percent by weight. These small particles have an average particle size ranging between about 10 to 1,000 millimicrons. The biaxially oriented polyethylene terephthalate film also includes substantially completely dispersed large size particles of an inert additive in a concentration in the range of between about 0.002 percent and 0.018 percent by weight. These large particles have an average particle size in the range of between about 0.5 and 30 microns.

DETAILED DESCRIPTION

The polyethylene terephthalate film of this invention is formed from a polymer produced by polymerization of bis(2-hydroxy ethyl) terephthalate. Bis(2-hydroxy ethyl) terephthalate is itself formed as an intermediate by one of two different methods. One method for producing bis(2-hydroxy ethyl) terephthalate is by direct esterification of terephthalic acid and ethylene glycol as described in U.S. Pat. No. 3,050,533. In this method the by-product of the reaction is water which is distilled from the reaction product. A second method for producing bis(2-hydroxy ethyl) terephthalate is by a transesterification reaction of a dialkyl ester of terephthalic acids, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification occurs more rapidly and completely. The transesterification reaction is conducted under conditions of elevated temperature. Preferably, the temperature is in the range of between about the boiling temperature of the reaction mixture to as high as 250°C. The reaction can occur at atmospheric, sub-atmospheric or superatmospheric pressure. The by-product of the transesterification reaction is an alkanol, for example, if dimethyl terephthalate is used, methanol is produced. The alkanol is removed from the reaction product. In order to increase the reaction rate, many known catalysts can be employed in the transesterification reaction.

After the bis(2-hydroxy ethyl) terephthalate has been produced, it is converted to polyethylene terephthalate polymer by heating to a temperature above the boiling point of ethylene glycol or the reaction mixture under conditions effecting the removal of the glycol or water. The heating may occur at a temperature as high as 325°C., if desired. In order to obtain the desired polymerized product it is essential that during the heating, or during a portion of the heating period, that the pressure be reduced so as to provide rapid distillation of the excess glycol or water. The pressure may be reduced in successive stages so that the heating begins at normal pressure. The pressure is thereafter reduced until a final reduced pressure is attained. Final ressures in the range of from about 1 to 10 millimeters Hg are preferred. The materials used as catalysts in the esterification reaction may also be present as a ctalyst in the polymerization reaction. The preferred polymerization catalysts are antimony compounds such as antimony trioxide, antimonic acid and the like. These polymerization catalysts accelerate conversion of the bis(2-hydroxy ethyl) terephthalate to polyethylene terephthalate polymer having an intrinsic viscosity, as measured in orthochlorophenol at 25°C., in excess of 0.3 deciliter per gram. More preferably, the intrinsic viscosity of the polymer ranges from about 0.4 to about 1.0 deciliter per gram, again measured in orthochlorophenol at 25°C. Still more preferably, the polyethylene terephthalate of the instant invention has an intrinsic viscosity of about 0.5 to about 0.7 deciliter per gram measured in orthochlorophenol at 25°C.

The heating of the polymerization reaction is conducted under conditions to prevent oxidation. To prevent the presence of oxygen a slow stream of an inert gas, for example nitrogen, carbon dioxide or the like, can be passed through or over the molten mass. During the heating and polymerization the viscosity of the melt gradually increases. Thus, the temperature must be maintained high enough to keep the mass in the molten state during the entire heating period. The heating is continued at least until a film can be formed from the melt which possesses the desired properties. Preferably, the melting point of the polymerized product exceeds about 240°C. Even more preferably, the melting point of the polymerized product is in excess of 250°C. After heating is completed the product may be utilized to produce films or otherwise remove from the reaction vessel in molten form and formed into blocks, chips and the like for further use.

Within the polyethylene terephthalate polymer described above is incorporated substantially competely dispersed particles of a large particle size inert additive and a small particle size inert additive. The terms "small" and "large" are not meant as absolute terms. Rather they are employed to distinguish the two size ranges necessary to produce the unique film of this invention. Within the contemplation of this invention the small particle size inert additive includes silica, which may be crystalline or amorphous, calcium carbonate, aluminum silicate, either calcined or hydrated, calcium phosphate, alumina, barium sulfate, magnesium sulfate (talc) and diatomaceous earth. Similarly, large particle size inert additives contemplates the following materials: calcium carbonate, aluminum silicate, either calcined or hydrated, magnesium silicate, calcium silicate, calcium phosphate, silica, either crystalline or amorphous, alumina, barium sulfate, mica, and diatomaceous earth. It should be noted that some of the materials recited above are useable as both the small and large size particle inert additives. It is within the contemplation of this invention that a single material may be employed as the large particle size additive as well as the small particle size additive. This can occur, of course, only when the single additive is present in two distinct size ranges. In general, any of the materials suitable as the small particle size inert additive may be combined with any of the materials listed as acceptable as the large particle size inert additive. It is essential, however, that both the large and small particle size inert additives be substantially completely dispersed throughout the polymer. A preferred method for insuring that the particles be completely dispersed is by adding the particles to the glycol and exposing the mixture to ultrasonic vibrations. However, it should be appreciated that any method that produces a substantially completely dispersed mixture is acceptable.

Within the contemplation of this invention the small particle size inert additive has an average particle size in the range of between about 10 and 1,000 millimicrons. The large particle size inert additive of this invention has an average particle size in the range of about 0.5 to 30 microns. The small particle size inert additive is present in a concentration in the range of between about 0.3 percent to about 2.5 percent by weight. More preferably, the concentration of the small particle size inert additive is in the range of between about 0.4 percent and 2.0 percent by weight. The large particle size inert additive is present in a concentration in the range of between about 0.002 percent to about 0.018 percent by weight. More preferably, the large particle size inert additive is present in the range of between about 0.005 percent and 0.015 percent by weight. Each of the above percentages by weight represents the percent of the additive present in the total polymeric composition. It should be further emphasized that these numbers apply to the formed film since the percentage by weight in the polymeric mass and in the film are approximately the same. It is further noted that the "average particle size" is defined as the volume of particle equal to the volume of a sphere of known cross-sectional area. The average particle size is measured by x-ray sedimentation analysis on a commercially available instrument such as the Micromeritics Model 5,000 Particle Size Analyzer.

After the polyethylene terephthalate polymer containing particles of the small particle size inert additive and the large particle size inert additive have been produced, the polymer is extruded on a polished revolving casting drum and biaxially stretched, i.e., stretched in the longitudinal and transverse direction in either order or simultaneously to impart strength and toughness to the resulting film. The amount of stretching can range from about 2.5 to about 4.0 times the original dimension. Preferably, the amount of stretching is in the range of between about 2.8 and 3.8 times the original dimension. The stretching operation is carried out at temperatures in the range of from about the second order transition temperature to below the temperature at which the polymer softens and melts. Preferably, this temperature range is between about 75°C. and 150°C.

After the film has been stretched, the film is heat treated for a period of time necessary to crystallize the polyethylene terephthalate film. Crystallization of the polyethylene terephthalate film imparts stability. The heat treatment temperature ranges from about 190°C. to about 240°C. and more prefeably from about 215°C. to about 235°C.

The unique film of the instant invention has the combined properties of clarity and good handleability. It is noted that the aforementioned patent application, U.S. Ser. No. 215,141, filed on Jan. 3, 1972, represents the only known prior art disclosure of employing a "bimodal" additive system. That is, this is the sole disclosure of a film filled with inert additives present in two size ranges. It has been found, that a film produced in accordance with the teachings of this application do not provide a suitable clear film with satisfactory handling characteristics. Similarly, it has been found that a single size inert additive, within the size and concentraation range of that contemplated by this invention, not present in conjunction with the other size ranged particles similarly do not produce the desired properties found in the films of this invention. Finally, as a control it has been conclusively shown that a non-filled polyethylene terephthalate film which does not contain any inert additives produces the clearest possible film but is unuseable because of its inferior handling characteristics.

The film produced in accordance with this invention, a clear-slip film, has an intrinsic viscosity, approximately the same as the polyethylene terephthalate polymer from which it is formed. Thus, the intrinsic viscosity of the film is in excess of 0.3 deciliter per gram as measured in orthochlorophenol at 25°C. More preferabl, the intrinsic viscosity of the film is in the range of between about 0.4 and 1.0 deciliter per gram measured in orthochlorophenol at 25°C. Still more preferably, the intrinsic viscosity is in the range of between about 0.5 and 0.7 diciliter per gram measured in orthochlorophenol at 25°C.

Clear-slip films aare usually characterized as thin films. That is, they are usually among the least thick of polymeric films. Thus, it is preferred that the film be no greater than 2 mils thick. It is to be noted that a mil is one thousandth of an inch. Also, one mil equals one hundred gauge units. It is emphasized, however, that the scope of this invention should not be limited by the thickness of the film produced.

All of the above conclusions are illustrated in the following examples. These examples are, of course, given to illustrate the invention and should not be construed, in any way, as limiting the scope and spirit of the invention illustrated by these examples.

EXAMPLE I

A polyethylene terephthalate polymer is prepared by initially placing 3500 pounds of dimethyl terephthalate and 2,600 pounds of ethylene glycol in a reaction vessel. The mixture is heated to 150°C. Additionally, 1.7 pounds of manganese glycol oxide in 6 pounds of ethylene glycol is added to the reaction mixture. The reaction mixture is heated to 200°C. at atmospheric pressure while removing methanol from the mixture for a period of time sufficient to remove the theoreticaal amount of methanol produced. The temperature is gradually increased while removing the excess glycol until the temperature reaches 225°C. to form monomeric bis(2-hydroxy ethyl) terephthalate. To the monomeric bis(2-hydroxy ethyl) terephthalate is added a catalyst, 1.5 pounds of antimony trioxide, dispersed in 6 pounds of ethylene glycol.

The monomeric bis(2-hydroxy ethyl) terephthalate is polymerized, during which time ethylene glycol is removed and the temperature is maintained at about 225°C. until the intrinsic viscosity of the polymer reaches about 0.63 deciliter per gram measured in orthochlorophenol at 25°C.

EXAMPLE II

A second batch of polyethylene terephthalate polymer is prepared in accordance with the procedure recited in Example I except that silica having an average particle size of about 20 millimicrons is added to the reactants prior to the transesterification reaction in which monomeric bis(2-hydroxy ethyl) terephthalate is produced. The mass of the 20 millimicron silica introduced is enough to produce a final concentration in the polyethylene terephthalate of 2 percent by weight. The silica is completely dispersed in the reactants prior to the transesterification reaction.

EXAMPLE III

A polyethylene terephthalate polymer is produced in accordance with the procedure enumerated in Example I except that alumina having an average particle size of 300 millimicrons is introduced into the batch along with the dimethyl terephthalate and ethylene glycol. The mass of the alumina added produces an alumina concentration of 1 percent by weight of the total composition.

EXAMPLE IV

A fourth batch of polyethylene terephthalate polymer is produced in accordance with the procedure described in Example I. In this example calcium carbonate is introduced along with the dimethyl terephthalate and ethlene glycol and completely dispersed therewithin. The calcium carbonate has an average particle size of 3.5 microns and is present in a weight amount sufficient to produce a final concentration of 0.30 percent by weight of the total weight of the filled polyethylene terephthalate batch.

EXAMPLE V

A fifth batch of polyethylene terephthalate is produced in accordance with the procedure described in Example I except that hydrated aluminum silicate is introduced along with the reactants in a weight concentration sufficient to produce a polyethylene terephthalate batch containing 0.125 percent by weight. The hydrated aluminum silicate has an average particle size of 1.0 micron.

EXAMPLE VI

A portion of the polyethylene terephthalate melt produced in accordance with Example I, that is, unfilled polyethylene terephthalate, is extruded onto a polished revolving drum to produce a continuous sheet. The cast sheet is subjected successively to a longitudinal direction stretch followed by a transverse direction stretch. The film is stretched to 3.5 times its original length in the longitudinal direction and 3.5 times its original width in the transverse direction. During stretching in both directions, the film is exposed to temperatures in the range of between about 75°C. and 130°C. The film is then heat set for 30 seconds at a temperature in the range of 190°C. to 240°C. and thereafter cooled and wound on a mandrel.

The film produced in accordance with this procedure is 50 gauge film. That is, the thickness of the film is 0.5 mil or 0.0005 inch. The intrinsic viscosity of the film is 0.6 deciliter per gram as measured in orthochlorophenol at 25°C.

The film is tested to determine its clarity. Clarity is conventionally determined in accordance with ASTM test procedure D1003-61 Procedure A. In this standard test a Gardner Haze Meter is employed to determine the percentage haze. Haze as measured on a Gardner Haze meter is defined as that percentage of transmitted light which is deviated by more than 2.5 degrees from incidence by forward scattering as it passes through the film. In practical terms, a haze not in excess of 2.5 percent is usually acceptable in applications usually associated with polyethylene terephthalate film. That is, a 2.5 percent haze or below is acceptable in packaging films and metallized films of the type which employs polyethylene terephthalate film as a base.

The film was additionally tested to determine its handleability. Handleability of a thermoplastic film is generally a function of the kinetic coefficient of friction. The coefficient of friction is a measure of the ease with which the film may be moved against another surface. Although a kinetic coefficient of friction in the range of between 0.3 and 0.6 is most suitable, a kinetic coefficient of friction as high as 0.7 is acceptable Any coefficient of friction in excess of 0.7 is difficult to work with and is unsatisfactory in polyethylene terephthalate film working. In most cases the handleability of an unsatisfactory polyethylene terephthalate film is characterized by blocking. This term indicates that the film cannot be moved over a surface because of its high coefficient of friction. The kinetic coefficient of friction is determined by a standard procedure, ASTM test D 1894-63.

The unfilled polyethylene terephthalate film, formed in accordance with the example enumerated herein, produces a haze as measured in accordance with ASTM test D 1003-61 Procedure A, of 0.35 percent. This percent haze represents a very clear film. Another sample of the film was tested to determine its kinetic coefficient of friction in accordance with ASTM test procedure D 1894-63. The film blocked and thus failed this handleability test.

This test indicates the excellent clarity of unfilled polyethylene terephthalate film. However, it also demonstrates the unsuitability of this type of polyethylene terephthalate film in terms of "slip." That is, an unfilled polyethylene terephthalate film is not suitable because of its difficult handling characteristics.

EXAMPLE VII

A polymer prepared in accordance with Example II, that is, 2 percent by weight filled silica having an average particle size of 20 millimicrons is formed into a film in accordance with the procedure described in Example VI. In addition silica filled polymeric melt formed in accordance with the procedure described in Example II is blended with unfilled polyethylene terephthalate melt formed in accordance with Example I to produce two additional batches having a concentration of 1.0 percent by weight and 0.25 percent by weight. Such a procedure is commonly employed in large batch testing. However, it should be emphasized that the results attained by blending are the same as if separate batches are prepared to produce the final concentration desired.

The three polymeric batches containing 0.25 percent, 1.0 percent and 2.0 percent, each by weight of the final total composition, are formed into 50 gauge polyethylene terephthalate films having an intrinsic viscosity of 0.6 measured in orthochlorophenol at 25°c. In accordance with the procedure described in Example VI. The films are thereafter tested to determine their "clear-slip" characteristics. Thus, the films are tested for clarity and frictional resistance. Each of the above silicafilled polyethylene terephthalate films produces a film having excellent clarity. The percentage haze, as measured on the Gardner Haze meter was 0.60 percent, 0.70 percent and 0.80 percent for the films containing 0.25 percent, 1.0 percent and 2.0 percent by weight respectively of 20 millimicron size silica. However, each of these films blocked when tested for coefficient of friction in accordance with ASTM standard test D 1894-63.

The results of this test indicate that a single small particle size inert additive, present over the spectrum of typically employed concentrations do not produce a satisfactory clear-slip polyethylene terephthalate film. It is furthermore concluded that a typical small particle size inert additive present in a size and concentration range within the contemplation of this invention but in the absence of a second large particle size inert additive does not produce an acceptable clear-slip polyethylene terephthalate film.

EXAMPLE VIII

The polymeric batch which includes 1 percent of 300 millimicron alumina prepared in accordance with the procedure described in Example III is formed into a 50 gauge, 0.6 intrinsic viscosity film in accordance with the procedure described in Example VI. The formed film is tested to determine its clear-slip properties. The film, containing 1 percent by weight of 300 millimicrons alumina yields a clarity, as measured on the Gardner Haze Meter, of 1.70 percent. This value is acceptable for clear polyethylene terephthalate films. The handleability, as manifested by the kinetic coefficient of friction, of this film is 0.57, which is also acceptable.

The above results are at odds with past experience. The film is therefore inspected and found to contain a significant amount of agglomerates. Agglomerates are concentrations of inert additives, in this case alumina, having an average particle size greatly in excess of the particle size of the nominal size of the additive. Their effect is equivalent to providing a ssecond large particle size material. Thus, it is postulated that this film which includes a small size inert additive within the cntemplation of the invention also contains a large particle size inert additive, within the range required to produce a clear-slip film.

To substantiate this theory another run was made with a much smaller amount of the small average particle size (300 millimicron) alumina, assuming that the agglomerate rate for this polymer batch provided a large particle size inert additive. The concentration of the small particle size alumina was purposely decreased to a level below the minimum level required to provide a satisfactory clear-slip film. That is, the concentration of the alumina was held to below 0.3 percent by weight. Specifically, the film included 0.25 percent by weight of alumina. This polyethylene terephthalate film was tested to determine its clear-slip propeties. Although the haze measurement was excellent, 0.6 percent, the film blocked and thus failed the handleability test.

The above results indicate that the small particle size inert additive, within the size and concentration limitations of this invention, can be the same inert additive as the large particle size additive if the larger particle size additive is within the size and concentration range of this invention.

EXAMPLE IX

Two 50 gauge 0.6 I.V. films are prepared which include a large particle size inert additive. The inert additive, calcium carbonate, having an average particle size of 3.5 microns is included in each of the two films which are formed in accordance with the procedure described in Example VI by blending of the batches produced in accordance with Examples I and IV to produce films filled with calcium carbonate having an average particle size of 3.5 microns and present in concentrations of 0.0075 percent and 0.01 percent by weight. The films are tested for haze and coefficient of friction in accordance with the procedures employed in Example VI. The haze for the two films were 0.57 percent and 1.00 percent respectively, which were both acceptable. However, the two films both failed in handleability in that both films blocked.

This example indicates that a typical large particle size additive within the size and concentration range contemplated for large particle size additive is not acceptable as an additive in polyethylene terephthalate films, in the absence of a second small particle size inert additive, to produce clear-slip film.

EXAMPLE X

A polymeric melt including 0.01 percent by weight of a second large particle size additive, hydrated aluminum silicate, is prepared by blending of the polyethylene terephthalate melts formed in Examples I and V. The melt including hydrated aluminum silicate having an average particle size of 1.0 micron is formed into a film in accordance with the procedure described in Example VI. Upon testing in accordance with the procedures described in Example VI it is found that this polyethylene terephthalate film has a haze of 1.00 percent, which is acceptable, but fails the kinetic coefficient of friction test in that the film blocked. Thus, a typical large particle size inert additive is again shown to be unacceptable as a clear-slip film when present in a size and concentration range within the contemplation of this invention but in the absence of a second small particle size inert additive.

EXAMPLE XI

Two polymeric melts are prepared which include both a small particle size inert additive and a large particle size inert additive. The small particle size inert additive is alumina having an average particle size of 300 millimicrons. In both melts its concentration is 0.5 percent by weight of the total composition. The second inert additive is calcium carbonate having an average particle size of 3.5 microns. In the first blend the concentration of the calcium carbonate is 0.0075 percent by weight of the total composition. In the second blend the concentration of the calcium carbonate having an average particle size of 3.5 microns is 0.01 percent by weight of the total composition. Both blends are prepared by proper blending of the melt batches formed in Examples I, III and IV. The blends are each formed into films in accordance with the procedures described in Example VI. Upon formation of the film the films which each have an intrinsic viscosity of 0.6 are 50 gauge, are tested to determine their clear-slip properties. The first film having the smaller concentration of the calcium carbonate is tested for clarity and slip in accordance with the ASTM procedures identified in Example VI. The test results are a haze rating of 1.07 percent, which is quite acceptable, and a kinetic coefficient of friction of 0.46, which is also quite acceptable. The second film, formed from the polymeric melt containing 0.5 percent by weight of alumina and 0.01 ppercent by weight of calcium carbonate, has a haze of 2.24 percent and a kinetic coefficient of friction of 0.45. Both of these values are acceptable for clear-slip applications.

The above example, in which two films are produced within the contemplation of this invention, yield results which are within the acceptable limits for clear-slip film.

EXAMPLE XII

Three additional 50 gauge, 0.6 I.V. films containing a small particle size inert additive and a large particle size inert additive are prepared. They are prepared in accordance with the procedures described in Example VI. In this case the small inert additive is silica having an average particle size of 20 millimicrons. The large particle size inert additive is calcium carbonate having an average particle size of 3.5 microns. In this case one of the films is prepared outside the range of the invention to determine if it was acceptable. The other two films were prepared within the range of the invention. The polymeric melts were prepared by proper blending of the melts formed in Examples I, II and IV. All three polymeric melts are converted into films in accordance with the procedure described in Example VI.

The first film contains 0.25 ppercent by weight of a silica and 0.005 percent by weight of calcium carbonate. It is noted that the concentration of the small particle size inert additive, silica, having an average particle size of 20 millimicrons, is outside the range of this invention. Upon testing it is found that the clarity rating is 0.70 percent haze, which is acceptable. The kinetic coefficient of friction test resulted in film blockage. Thus, the slip property, or handleability, is totally unacceptable.

The second film, within the contemplation of this invention, has a small particle size inert additive concentration of 0.50 percent by weight of silica whose average particle size is 20 millimicrons. The large particle size inert additive, again calcium carbonate, is present in a concentration of 0.013 percent by weight. The calcium carbonate has an average particle size of 3.5 microns. This film is tested by ASTM procedures described in Example VI. It has a clarity rating of 2.10 percent haze, which is acceptable and a kinetic coefficient of friction of 0.43, which is well within the acceptable range.

The third film produced in this example is a film having a small particle size inert additive concentration of 1.00 percent by weight of silica having a 20 millimicron average particle size. The large particle size inert additive, calcium carbonate having a 3.5 micron averagge particle size, is present in a concentration of 0.005 percent by weight of the total composition. The ASTM test results for this film are 1.00 percent haze, an acceptable value, and 0.44 kinetic coefficient of friction also an acceptable value.

The latter two films illustrate the acceptability of a large particle size inert additive in combination with a small particle size inert additive within the concentration and range of this invention. It is noted that Example XII employs a different small particle size inert additive than does Example XI, without any change in acceptability as a clearslip film.

EXAMPLE XIII

Two additional polyethylene terephthalate batches are prepared containing another combination of small particle size inert additive and large particle size inert additive. In this case the small particle size inert additive is silica having an average particle size of 20 millimicrons. The large particle size inert additive is hydrated aluminum silicate having an average particle size of 1 micron (1,000 millimicrons). The batches are prepared by blending the polyethylene terephthalate melts formed in Examples I, II and V. In each of the two additive filled polyethylene terephthalate melts the silica concentration is 1 percent by weight of the total composition. In the first of the two blends the hydrated aluminum silicate is present in a concentration of 0.0075 percent by weight and in the second melt the concentration of the hydrated aluminum silicate is 0.01 percent by weight. The two polyethylene terephthalate melts are prepared into 50 gauge, 0.6 I.V. film in accordance with the procedure described in Example VI. They are thereafter tested for their clear-slip properties in accordance with ASTM test procedures enumerated in Example VI. Both films are found to be excellent clear-slip products. The film containing 0.0075 percent by weight of hydrated aluminum silicate in combination with 1 percent by weight of silica has a haze of 1.2 percent and a kinetic coefficient of friction of 0.64. Both of these values represent a superior clear-slip product. The second film which includes 0.01 percent by weight of hydrated aluminum silicate in combination with 1 percent by weight of silica has a 1.0 percent by weight haze rating and a kinetic coefficient of friction of 0.52. These results are even somewhat better than the first film containing .0075 percent hydrated aluminum silicate.

EXAMPLE XIV

Two polyethylene terephthalate melt blends are prepared to produce films within the contemplation of U.S. Pat. application, Ser. No. 215,141, filed on Jan. 3, 1972. This test is made to determine whether films made in accordance with the teachings of that invention produce satisfactory clear-slip films. In the above recited patent application claim was made to an abrasion resistant film containing calcium carbonate as the large particle size inert additive in combination with either silica or hydrated aluminum silicate as the small particle size additive. Both melts in this example include, of course, calcium carbonate, having an average particle size of 3.5 microns, present in a concentration of 0.02 percent by weight of the composition. The first melt also includes, as the small particle size inert additive, silica, having an average particle size of 20 millimicrons, and present in a concentration of 0.25 percent by weight of the composition. This melt is formed into a 50 gauge 0.6 I.V. polyethylene terephthalate film in accordance with the procedure described in Example VI. The film is tested for its clear-slip properties. It is found to have an acceptable haze level, 1.70 percent but fails in kinetic coefficient of friction, which is found to be 0.91. As stated previously, a kinetic coefficient of friction in excess of .7 is unacceptable as a clear-slip film.

The second polymeric melt is prepared with hydrated aluminum silicate as the small particle size additive. As stated above, the large particle size additive is calcium carbonate having an average particle size of 3.5 microns and present in a concentration of 0.02 percent by weight. The hydrated aluminum silicate in this melt has an average particle size of 1 micron and is present in a concentration of 0.125 percent by weight of the total composition. This melt is formed into a 50 gauge, 0.6 I.V. film in accordance with the procedure used to form the film of Example VI. The film is tested for clear-slip properties in accordance with ASTM test procedures and yields a clarity rating of 3.4 percent haze and a slip rating of 0.42 kinetic coefficient of friction. This film is not acceptable as a clear-slip film. In this case failure results because of its poor clarity. The haze rating of 3.4 percent is significantly in excess of the maximum acceptable haze percentage.

This example indicates that film made in accordance with the above named patent application is unacceptable as a clear-slip film.

The above preferred embodiments and examples illustrate the scope of the instant invention. Other embodiments and examples within the scope and spirit of the instant invention are within the contemplation of this invention. Therefore, the scope of this invention should be limited only by the scope of the appended claims.

What is claimed is:

1. A biaxially oriented polyethylene terephthalate film characterized by the inclusion of a small particle size inert additive having an average particle size ranging between about 10 and 1,000 millimicrons and provided in a concentration in the range of between about 0.3 percent and 2.5 percent by weight of the total film and further characterized by the inclusion of a large particle size inert additive having an average particle size in the range of between about 0.5 and 30 microns, said large particle size inert additive present in a concentration in the range of between about 0.002 percent and 0.018 percent by weight of the film, said large particle size and said small particle size inert additives being substantially completely dispersed throughout said film wherein said film has a thickness no greater than 2 mils, a haze not in excess of 2.5 percent, and a kinetic coefficient of friction not in excess of 0.7.

2. A film in accordance with claim 1 wherein said small particle size inert additive is present in a concentration in the range of between about 0.4 percent and 2 percent by weight of said polyethylene terephthalate film and said large particle size additive is present in a concentration in the range of between about 0.005 percent and 0.015 percent by weight of said polyethylene terephthalate film.

3. A film in accordance with claim 1 wherein said polyethylene terephthalate film has an intrinsic viscosity in excess of 0.3 deciliter per gram.

4. A film in accordance with claim 1 wherein said small particle size inert additive is selected from the group consisting of silica, calcium carbonate, calcined aluminum silicate, hydrated aluminum silicate, calcium phosphate, alumina, barium sulfate, magnesium sulfate and diatomaceous earth.

5. A film in accordance with claim 4 wherein said small particle size inert additive is alumina.

6. A film in accordance with claim 4 wherein said small inert additive is silica.

7. A film in accordance with claim 1 wherein said large particle size inert additive is selected from the group consisting of calcium carbonate, calcined aluminum silicate, hydrated aluminum silicate, magnesium silicate, calcium silicate, calcium phosphate, silica, alumina, barium sulfate, mica and diatomaceous earth.

8. A film in accordance with claim 7 wherein said large particle size inert additive is calcium carbonate.

9. A film in accordance with claim 7 wherein said large particle size inert additive is hydrated aluminum silicate.

* * * * *